United States Patent [19]
Ma

[11] Patent Number: 5,581,375
[45] Date of Patent: Dec. 3, 1996

[54] METHOD FOR PROCESSING COLOR-IMAGE SIGNALS FROM A THREE-COLOR ORIGINAL AND FOR FORMING OUTPUT COLOR IMAGE HAVING BLACK, WHITE AND EITHER RED OR BLUE

[75] Inventor: Jin Ma, Tokyo, Japan

[73] Assignee: Ricoh Company, Ltd., Tokyo, Japan

[21] Appl. No.: 280,794

[22] Filed: Jul. 26, 1994

[30] Foreign Application Priority Data

Jul. 30, 1993 [JP] Japan .................................. 5-190266

[51] Int. Cl.$^6$ ..................................................... H04N 1/56
[52] U.S. Cl. ........................... 358/518; 358/538; 358/529
[58] Field of Search ..................................... 358/518, 519, 358/520, 521, 529, 532, 533, 536, 537, 538, 504; 355/326 R; H04N 1/56, 1/58

[56] References Cited

U.S. PATENT DOCUMENTS

5,028,991 7/1991 Sekizawa et al. ...................... 358/537
5,187,521 2/1993 Shimizu et al. ........................ 358/518
5,343,310 8/1994 Tasaki et al. ............................ 358/518
5,452,018 9/1995 Capitant et al. ........................ 358/518

*Primary Examiner*—Kim Vu
*Attorney, Agent, or Firm*—Lowe, Price, LeBlanc & Becker

[57] ABSTRACT

A color-image processing method is provided in which a two-color image can be formed in accordance with three color-image signals obtained by scanning a color original without having a color shear. A designated color is selected. A pixel is determined as the designated color by comparing the color-image signal with a sum of another color-image signal and a correction value. The pixel is determined as black when the color of the pixel has not been determined as the designated color. The pixel is determined as white by comparing intensity of the three color-image signal with predetermined threshold values. A color of a focus pixel is corrected by comparing linear patterns of colors of four consecutively arranged pixels including the focus pixel with a plurality of reference color patterns.

15 Claims, 8 Drawing Sheets

| | | | | |
|---|---|---|---|---|
| RP1 | 1 | 1 | 2 | 0 |
| | D | D | BK | W |

| | | | | |
|---|---|---|---|---|
| RP2 | 2 | 2 | 1 | 0 |
| | BK | BK | D | W |

| | | | | |
|---|---|---|---|---|
| RP3 | 0 | 2 | 1 | 0 |
| | W | BK | D | W |

BK ··· BLACK
W ··· WHITE
D ··· DESIGNATD COLOR

|   | 1  | 2  | 3  | 4  | 5  |
|---|----|----|----|----|----|
| 1 | 11 | 12 | 13 | 14 | 15 |
| 2 | 21 | 22 | 23 | 24 | 25 |
| 3 | 31 | 32 | 33 | 34 | 35 |
| 4 | 41 | 42 | 43 | 44 | 45 |
| 5 | 51 | 52 | 53 | 54 | 55 |

FIG.6B

| LP1 | 31 | 32 | 33 | 34 |
|-----|----|----|----|----|

| LP2 | 35 | 34 | 33 | 32 |
|-----|----|----|----|----|

| LP3 | 13 | 23 | 33 | 43 |
|-----|----|----|----|----|

| LP4 | 53 | 43 | 33 | 23 |
|-----|----|----|----|----|

| LP5 | 11 | 22 | 33 | 44 |
|-----|----|----|----|----|

| LP6 | 55 | 44 | 33 | 22 |
|-----|----|----|----|----|

| LP7 | 15 | 24 | 33 | 42 |
|-----|----|----|----|----|

| LP8 | 51 | 42 | 33 | 24 |
|-----|----|----|----|----|

METHOD FOR PROCESSING COLOR-IMAGE SIGNALS FROM A THREE-COLOR ORIGINAL AND FOR FORMING OUTPUT COLOR IMAGE HAVING BLACK, WHITE AND EITHER RED OR BLUE

BACKGROUND OF THE INVENTION

The present invention generally relates to a color-image processing method, and more particularly to a color-image processing method in which a two-color image such as a red-black image or a blue-black image can be formed in accordance with three color-component signals, such as color signals corresponding to red, green and blue, obtained by scanning a color original.

As a copy machine, a monochrome copy machine and a full-color copy machine are commercially available. The monochrome copy machine is relatively inexpensive, and thus it has become widely used. The full-color copy machine can produce a full-color picture having a gradation in brightness, but it is relatively expensive.

The full-color copy machine scans a color original to obtain three color-component signals. The three color-component signals correspond to colors R (red), G (green) and B (blue) having a gradation in brightness. The three color-component signals R, G and B are then processed so as to be converted into image signals corresponding to colors C (cyan), M (magenta) and Y (yellow). After that, the image signals C, M and Y are converted into four color-signals C, M, Y and BK (black). When a gradation is needed, a dot size for each color is changed.

However, color originals are not always a full color image having a fine gradation levels such as a color photograph. Many color-originals may be a picture or a document having additional letters in red or colored letters to enhance an importance of the letters. That is, many color-originals may be an image comprising only two colors, practically, such as a black color image added with a red or blue image.

Such two-color image can be copied, of course, using the full-color copy machine, however, there is a problem in that it must take a time to perform image forming operation for four colors. When an original has color portions for only enhancing it or distinguishing it from other portions, a chroma or brightness of the color portions in a copied print can be in a level in which the color of the color portion is not so important. In such a case, a color image formed by means of two-color image forming process is even better than that formed by means of a three-color image forming process, and the image processing time can be reduced to three quarters or one half of that required by the three-color image.

When forming the two-color image in accordance with three color image signal, there may occur a color shear due to a positional tolerance between three CCD lines. Such a color shear is hardly recognized in an image having continuously varied gradation level or hue.

However, the full-color copy machine generally uses a high resolution print engine so that a decrease in resolution is hardly recognized when a dot size is changed. Accordingly, when there is a slight color shear at an edge of a binary image having a high resolution without having a dot size change, a color may appear at an edge of a black image or black may appear at an edge of a color image.

Therefore, when forming a two-color image, in particular, two-color binary image, more care is to be taken regarding the color shear rather than that of the full-color image. Thus, a color shear correction is required to be performed on input color-image signals in addition to an accurate positioning of the three line CCDs.

SUMMARY OF THE INVENTION

It is a general object of the present invention to provide an improved and useful color-image processing method in which the above-mentioned disadvantages are eliminated.

A more specific object of the present invention is to provide a color-image processing method in which a two-color image can be formed in accordance with three color-image signals obtained by scanning a color original.

Another object of the present invention is to provide a color-image processing method in which a two-color image can be formed in accordance with three color-image signals without having a color shear appearing at an edge of a printed image. In order to achieve these objects, the invention provides a color-image processing and image forming method for processing three color-image signals obtained by scanning a color original, including a red-image signal representing an intensity of red color of a pixel, a green-image signal representing an intensity of green color of a pixel, and a blue-image signal representing an intensity of blue color of a pixel. The color-image processing method has the following steps. A preliminary step involves selecting either red or blue as a "designated color". Then there are the steps of determining a color of the pixel as red, when red is selected as the designated color in step a), if a value of the red-image signal is greater than a sum of a value of the green-image signal and a predetermined red correction value; or determining a color of the pixel as blue, when blue is selected as the designated color in the step a), if a value of the blue-image signal is greater than a sum of a value of the red-image signal and a predetermined blue correction value. The invention also has the step of determining a color of the pixel as black when the color of the pixel has not been determined in step b) or step c). Finally, the invention involves the step of forming an output image in accordance with determination results obtained in steps b), c) and d), in which the output image has black, white and the designated color.

Additionally, the color-image processing method according to the present invention comprises the steps of:

f) determining a color of the pixel as white, when red is selected as the designated color in the step a), if the value of the red-image signal is greater than the threshold value for the red-image signal and the value of the green-image signal is greater than the threshold value for the green-image signal regardless of the determination results in the steps a) and d); and g) determining a color of the pixel as white, when blue is selected as the designated color in the step b), if the value of the blue-image signal is greater than the threshold value for the blue-image signal and the value of the red-image signal is greater than the threshold value for the red-image signal regardless of determination results in the steps b) and d).

The color-image processing method according to the present invention further comprises the steps of:

h) preparing a 5×5 pixel matrix pattern in which a focus pixel is located in the center thereof using the color of the pixel determined in the steps a) through g);

i) preparing linear patterns of the color of the pixel, the linear pattern comprising four pixels including the focus pixel consecutively arranged along a line in the 5×5 pixel matrix pattern, the focus pixel being in a predetermined position of each of the linear patterns;

j) comparing each of the linear patterns with each of predetermined reference patterns so as to determine whether or not at least one of the linear patterns matches to one of the predetermined reference patterns;

k) changing the color of the focus pixel from black to the designated color selected in the step a) when the color of the focus pixel has been determined as black in the step d), and generating an ID signal representing that the focus pixel is the designated color selected in the step a);

l) changing the color of the focus pixel from the designated color selected in the step a) to black when the color of the focus pixel has been determined as red in the step b) or blue in the step c), and generating an ID signal representing that the focus pixel is black; and m) generating an ID signal representing that the focus pixel is white when none of the linear patterns matches with each of the predetermined reference patterns.

Other objects, features and advantages of the present invention will become more apparent from the following detailed description when read in conjunction with the accompanying drawings.

DETAILED DESCRIPTION OF THE PREFERRED EMBODIMENT

Figure 1:
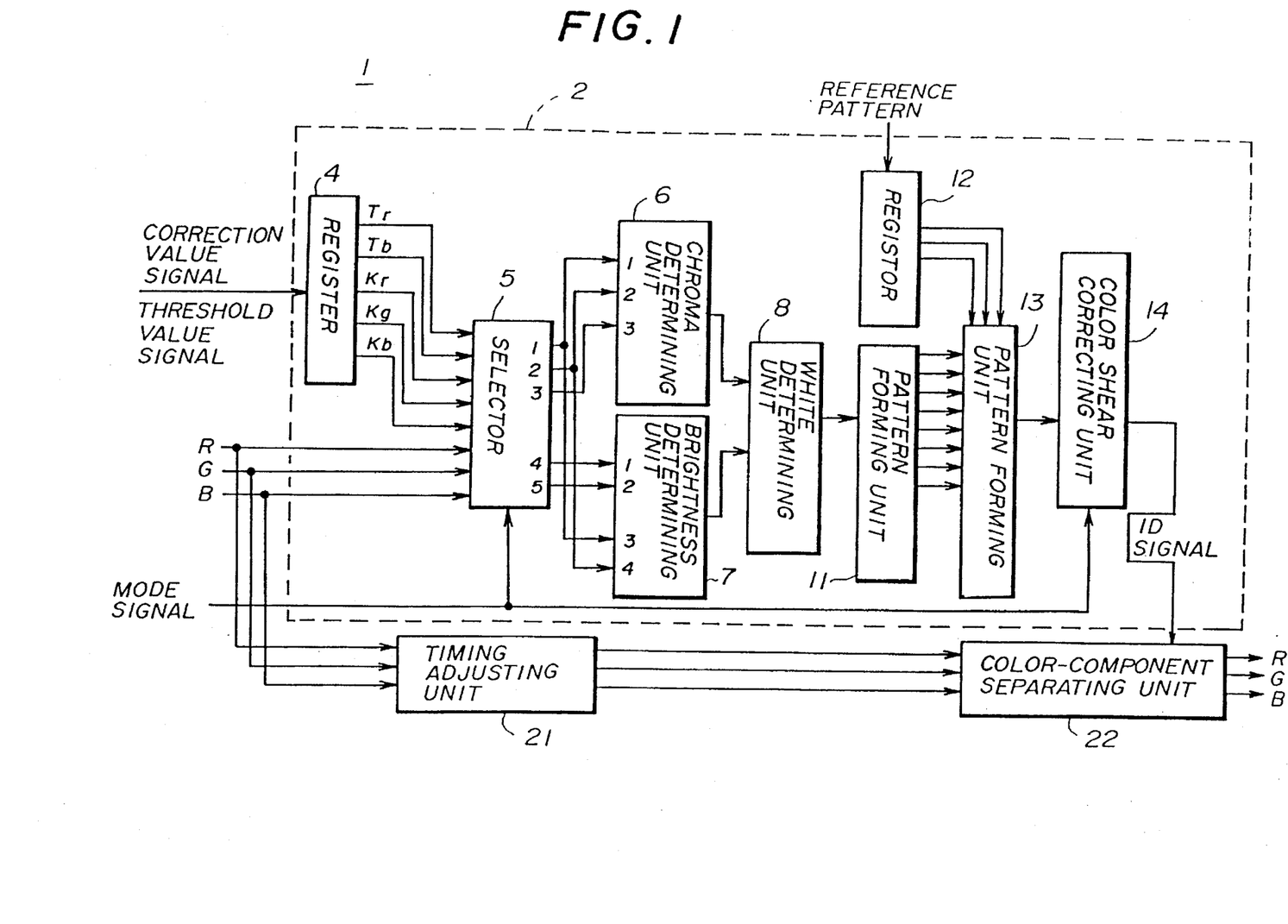
FIG. 1 is a block diagram of a color-image forming unit in which an embodiment of a color-image processing method according to the present invention is performed.

A description will now be given of an embodiment of a color-image processing method according to the present invention. FIG. 1 is a block diagram of a color-image processing unit 1 in which the color-image processing method according to the present invention is performed.

The color-image processing unit 1 comprises a two-color image processing unit 2, a timing adjusting unit 21 and a color-component separating unit 22. The two-color image processing unit 2 comprises a first section and a second section, the first section being provided for discriminating two colors and the second section for correcting a color shear. The first section comprises a register 4, a selector 5, a chroma determining unit 6, a brightness determining unit 7, a white discriminating unit 8. The second section comprises a pattern forming unit 11, a register 12, a pattern matching unit 13 and a color shear correcting unit 14.

In an initialization process, a mode signal is input to the two-color image processing unit 2 when one of red-black mode or blue-black mode is selected by an operator. The mode signal is supplied to the selector 5 and the color shear correcting unit 14. When the mode signal is supplied, correction value signals Tr and Tb and threshold value signals Kr, Kg and Kb are input from a ROM (not shown in the figure) to the register 4, and three reference pattern signals are input from the ROM to the register 12. The correction value signals Tr and Tb, each comprising 8-bit data, represent correction values for red and blue, respectively. The threshold value signals Kr, Kg and Kb, each comprising 8-bit data, represent threshold values for red, green and blue, respectively.

Figure 2:
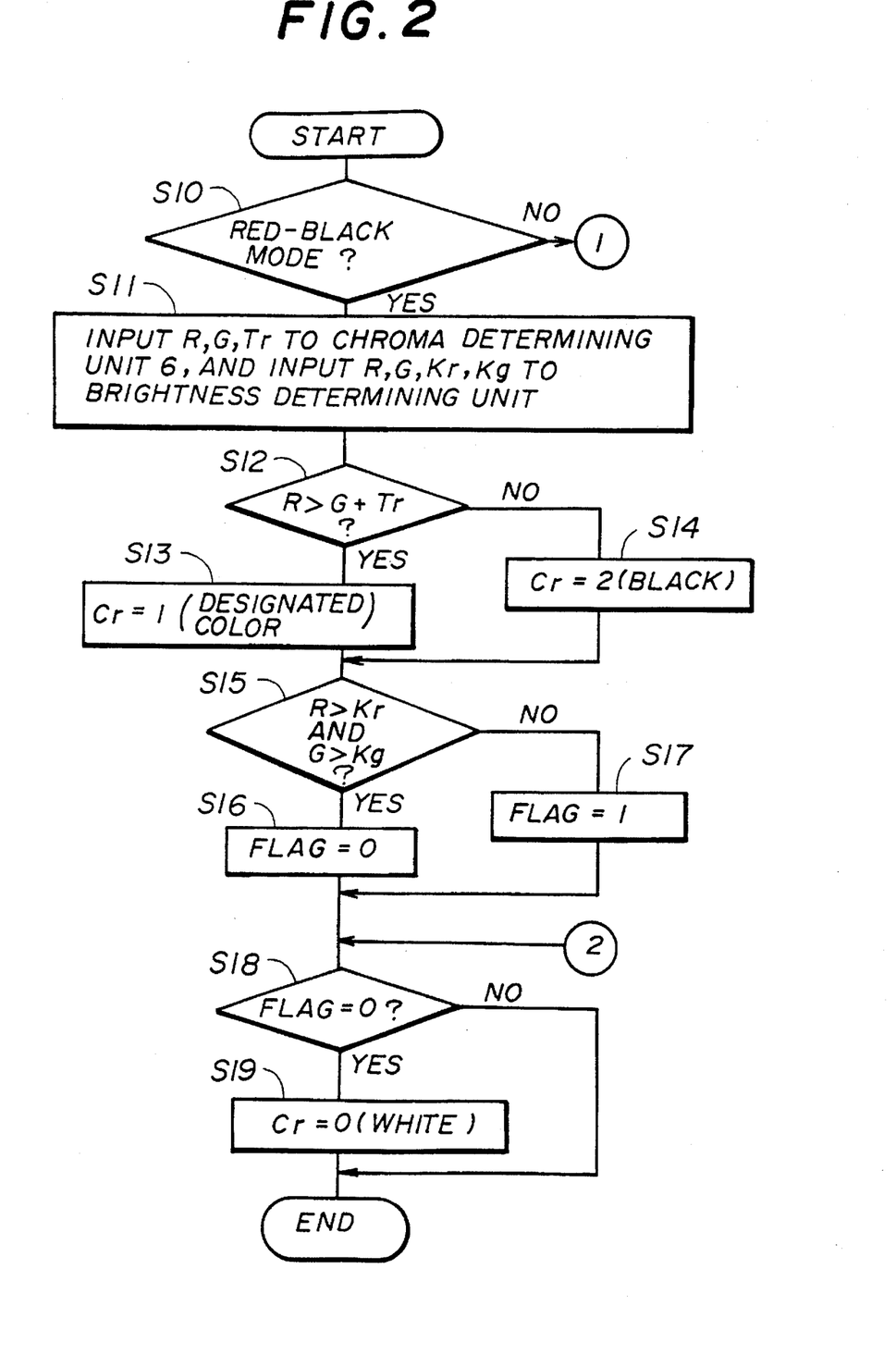
FIG. 2 is a part of a flow chart of a process performed in a first section of the two-color image processing unit shown in FIG. 1.
Figure 3:
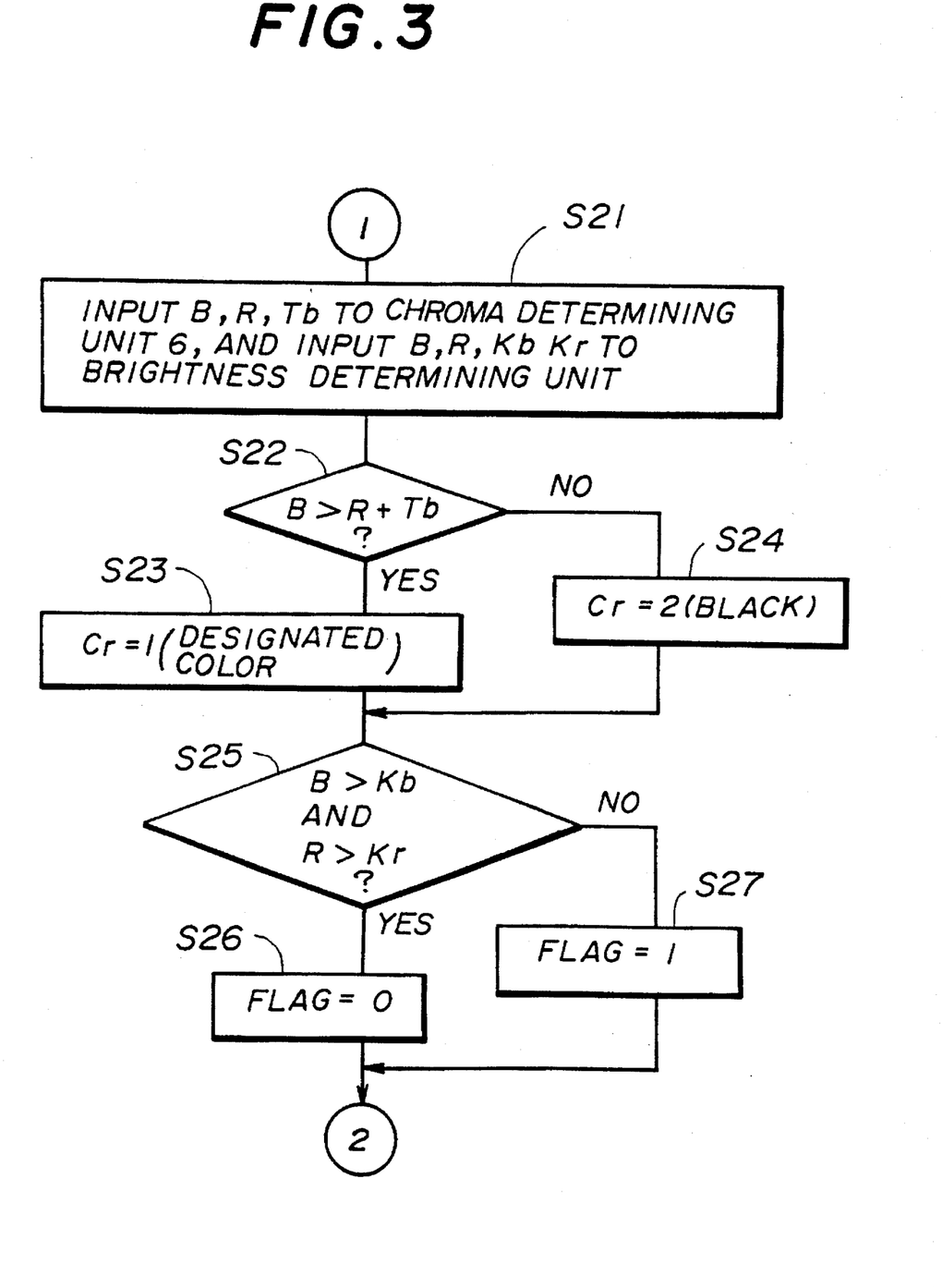
FIG. 3 is a part of a flow chart of a process performed in a first section of the two-color image processing unit shown in FIG. 1.

FIGS. 2 and 3 are parts of a flow chart of a process performed by the first section of the two-color image processing unit 2. FIG. 2 show a case in which the red-black mode is selected, and FIG. 3 shows a case in which the blue-black mode is selected.

A description will now be given, with reference to FIGS. 1, 2 and 3, of a two-color discriminating process performed by the first section of the two-color image processing unit.

The routine shown in FIG. 2 starts when the above-mentioned initialization is completed and color-image data signals R, G and B are input to the selector 5. The color image-data signals, which comprise 8-bit data and include gradation information, are obtained by a scanner for each three color-components. Processes of steps 10 and 11 (hereinafter "step" is abbreviated as S) are performed by the selector 5.

In S10, it is determined by the selector 5 whether or not the red-black mode has been selected by an operator. If the red-black mode has been selected, the routine proceeds to S11 where the image signals R and G are selected and input to terminals #1 and #2 of the chroma determining unit 6, respectively, and also input to terminals #3 and #4 of the brightness determining unit 7, respectively. If the determination of S10 is negative, that is, if the blue-black mode has been selected, the routine proceeds to S21 shown in FIG. 3.

At the same time, in S11, the correction value signal Tr is selected by the selector 5 and input to a terminal #3 of the chroma determining unit 6, and the threshold value signals Kr and Kg are selected and output to terminals #1 and #2 of the brightness determining unit 7.

The following S12 to S14 are performed by the chroma determining unit 6. In S12, the color-image signal R being input to the terminal #1 is compared with a sum of the color-image signal G and the correction value signal Tr being input to the terminals #2 and #3, respectively. If it is determined that the color-image signal R is greater than the sum of the color-image signal G and the correction value signal Tr, the routine proceeds to S13 where a color signal, which represents a discriminated color, is set to 1 (in this case, 1 represents red). If it is determined that the color-image signal R is equal to or smaller than the sum of the color-image signal G and the correction value signal Tr, The routine proceeds to S14 where the color signal is set to 2 (in this case, 2 represents black), and then the routine proceeds to S15.

The following S15 to S17 are performed by the brightness determining unit 7. In S15, the color-image signal R being input to the terminal #3 is compared with the threshold value signal Kr being input to the terminal #1 and the color-image signal G being input to the terminal #4 is compared with the threshold value signal Kg being input to the terminal #2. If it is determined that the color-image signal R is greater than the threshold value signal Kr, and the color-image signal G is greater than the threshold value signal Kg, the routine proceeds to S16 where a flag is reset to 0, and then the routine proceeds to S18. Otherwise, the routine proceeds to S17 where the flag is set to 1, and the routine proceeds to S18.

It should be noted that, in this embodiment, since Kr, Kg and Kb are set to values relatively bright levels (Kr=220, Kg=200, Kb=200), if the image signals R and G are greater than the threshold value signals Kr and Kg, respectively, the image signals R and G can be determined to be white in the two-color image.

The following S18 and S19 are performed by the white discriminating unit 8. In S18, it is determined whether or not the flag is 0. If it is determined that the flag is 0 the routine proceeds to S19 where the color signal Cr is set to 0 (in this case 0 represents white), and routine ends. If it is determined that the flag is not equal to 0, the routine ends without changing the value of the color signal Cr.

On the other hand, if it is determined, in S10, that the blue-black mode is selected, the routine proceeds to S21 shown in FIG. 3. S21 to S26 shown in FIG. 3 correspond to the above-mentioned S11 to S16 shown in FIG. 2.

That is, if the blue-black mode has been selected, the routine proceeds to S21 where the image signals B and R are selected and input to the terminals #1 and #2 of the chroma determining unit 6, respectively, and also input to the terminals #3 and #4 of the brightness determining unit 7, respectively. At the same time, in S21, the correction value signal Tb is selected by the selector 5 and input to the terminal #3 of the chroma determining unit 6, and the threshold value signals Kb and Kr are selected and output to the terminals #1 and #2 of the brightness determining unit 7.

In S22, the color-image signal R being input to the terminal #1 is compared with a sum of the color-image signal R and the correction value signal Tb being input to the terminals #2 and #3, respectively. If it is determined that the color-image signal B is greater than the sum of the color-image signal R and the correction value signal Tb, the routine proceeds to S23 where the color signal, which represents a discriminated color, is set to 1 (in this case, 1 represents blue). If it is determined that the color-image signal B is equal to or smaller than the sum of the color-image signal R and the correction value signal Tb, the routine proceeds to S24 where the color signal is set to 2 (in this case, 2 represents black), and then the routine proceeds to S25.

In S25, the color-image signal B being input to the terminal #3 is compared with the threshold value signal Kb being input to the terminal #1 and the color-image signal R being input to the terminal #4 is compared with the threshold value signal Kr being input to the terminal #2. If it is determined that the color-image signal B is greater than the threshold value signal Kb, and the color-image signal R is greater than the threshold value signal Kr, the routine proceeds to S26 where the flag is reset to 0, and then the routine proceeds to S18 shown in FIG. 2. Otherwise, the routine proceeds to S27 where the flag is set to 1, and then the routine proceeds to S18.

The above mentioned two-color image forming process is repeated for image data for each pixel obtained by scanning a full-color original. Accordingly, the color-image signals R, G and B for each pixel are determined to be signals correspond to either white (0), red or blue (1) or black (2), and output from the white discriminating unit 8. The output signals from the white discriminating unit 8 are temporarily stored in a memory not shown in the figure.

It should be noted that, in the abovementioned process, although the process for the red-black mode is different from that of the blue-black mode, the operations of the chroma determining unit 6 and the brightness determining unit 7 are the same. That is, the chroma determining unit 6 compares the signal being input to the terminal #1 with the sum of the signals being input to the terminals #2 and #3 so as to set the color signal Cr to either the value 1 corresponding to the designated color (red or blue) or the value 2 corresponding to black. Additionally, the brightness determining unit 7 compares the signal being input to the terminal #3 with the signal being input to the terminal #1, and also compares the signal being input to the terminal #4 with the signal being input to the terminal #2 so as to set the flag to either 0 or 1. Therefore, the processes of S11 to S17 shown in FIG. 2 and the process of S21 to S27 shown in FIG. 3 are performed by the same hardware.

Figure 4:
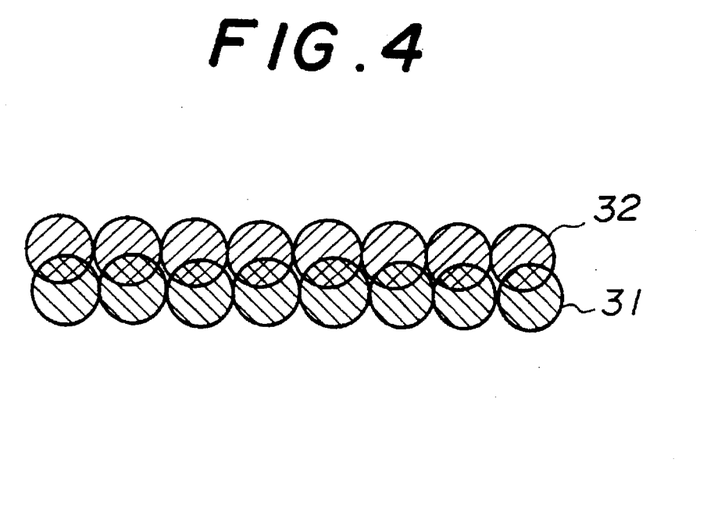
FIG. 4 is an illustration showing a positional relationship between scanned areas corresponding to two line CCDs provided in a scanner.

A description will now be given of a process for a color shear correction performed by the second section of the two-color image processing unit 2 for a case in which the red-black mode is selected. FIG. 4 is an illustration showing a positional relationship between scanned areas corresponding to two line CCDs provided in a scanner. FIGS. 5A through 5E are illustrations showing a transition of a color image from an original to a corrected image.

In FIG. 4, each of areas 31 arranged along a line corresponds to a red-image data signal for each pixel data scanned by a red-CCD, and each of areas 32 arranged along a line corresponds to a green-image data signal for each pixel data scanned by a green-CCD. It should be noted that areas corresponding to a blue-CCD are not shown in the figure for the sake of convenience. Although the areas 31 and the areas 32 are slightly apart from each other in a practical example, the areas 31 and 32 shown in FIG. 4 is described as if the areas 31 and 32 are overlapped with each other so that a tolerance in relative position can be easily understood. The overlapping areas indicated by hatching represent the tolerance.

Figure 5A:
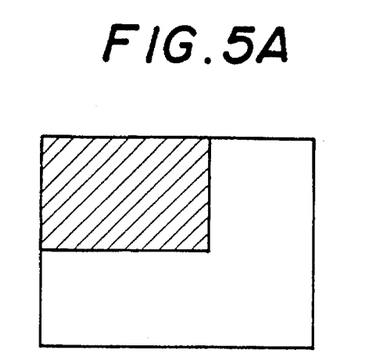
FIGS. 5A through 5E are illustrations showing a transition of a color image from an original to a corrected image.
Figure 5B:
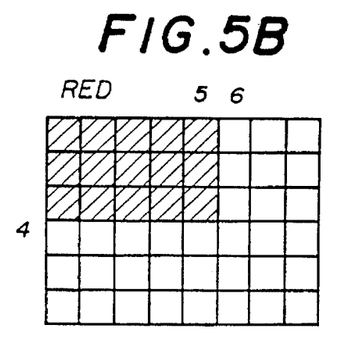
Figure 5C:
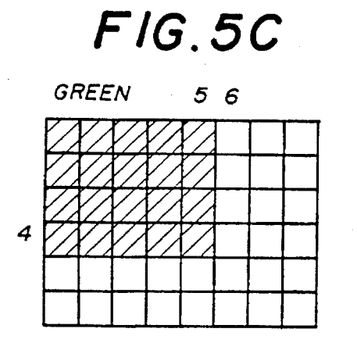

FIG. 5A shows an original having a black portion indicated by a hatched area and a white portion other than the hatched area. FIG. 5B shows a bit map which is obtained in accordance with a red-image data signal obtained by the red-CCD. FIG. 5C shows a bit map which is obtained in accordance with a green-image data signal obtained by the green-CCD. The hatched portions of FIGS. 5B and 5C correspond to pixels having no signal.

Comparing FIG. 5B with FIG. 5C, it is observed that longitudinal edge lines of FIG. 5B and FIG. 5C lie in the same number column, that is, in the fifth column. However, transverse edge lines do not lie in the same row of the bit maps. That is, the transverse edge line in FIG. 5B lies in the third row while the transverse edge line in FIG. 5C lies in the fourth row. This means that the bit map shown in FIG. 5B has the red-image data signals corresponds to the fourth row while the bit map shown in FIG. 5C does not have green-image data signals corresponds to the fourth row.

Figure 5D:
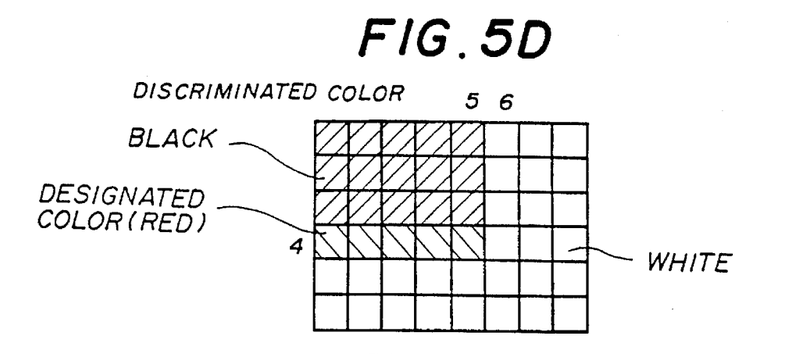

FIG. 5D shows a bit map of which image signals are processed by the above-mentioned two-color image forming unit 2. As shown in FIG. 5D, the bit map obtained by means of the two color image forming unit 2 has portions corresponding to black, the designated color (red in this case) and white.

Accordingly, if a color-image is formed in accordance with the bit map shown in FIG. 5D, a red edge due to color shear appears directly below the black area.

Figure 6A:
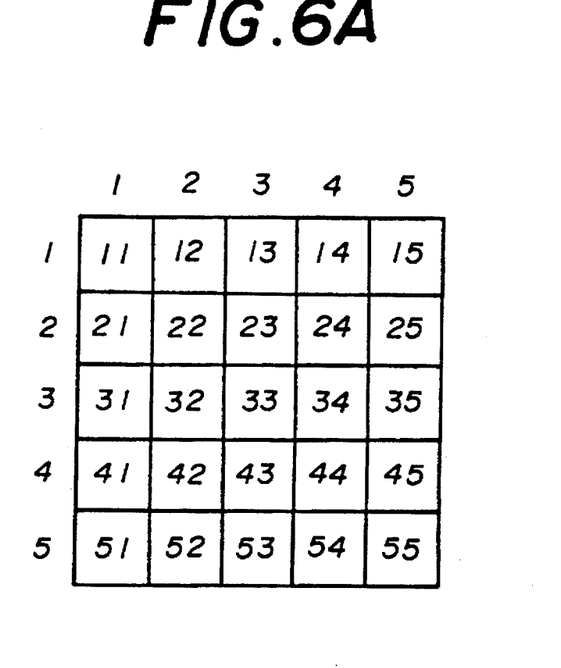
FIG. 6A is an illustration showing a 5×5 pixel matrix pattern in which a focus pixel is located in the center thereof.

FIG. 6A shows a 5×5 pixel matrix pattern in which a focus pixel is located in the center thereof. The number in the pixel matrix pattern indicates a matrix coordinate value. Accordingly, a pixel located in the matrix coordinate value (33) is the focus pixel.

Figure 6B:
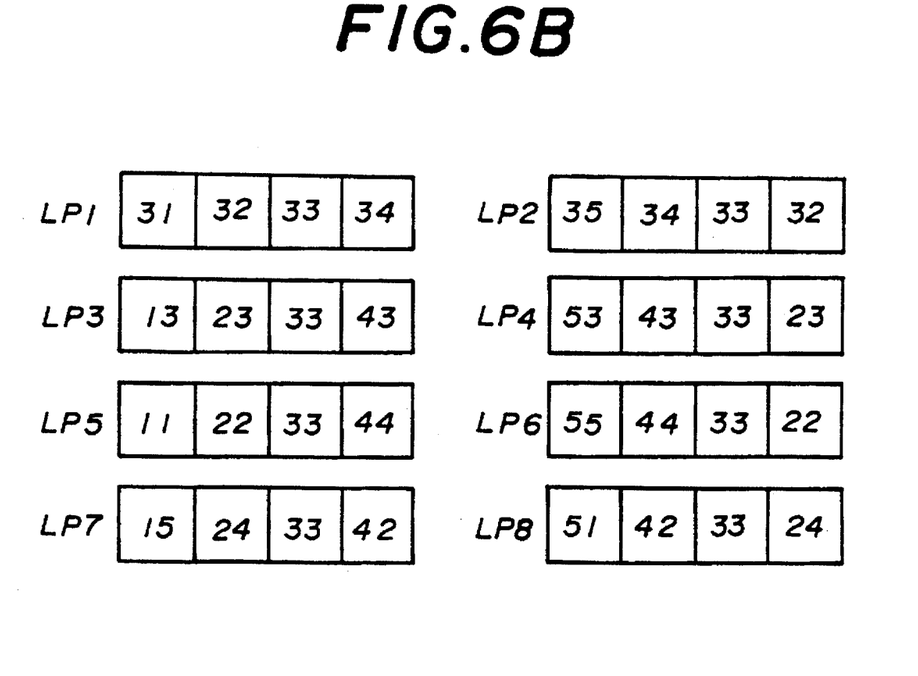
FIG. 6B is an illustration showing eight linear patterns LP1 to LP8 derived from the pixel matrix pattern shown in FIG. 6A.

FIG. 6B shows eight linear patterns LP1 to LP8 derived from the pixel matrix pattern shown in FIG. 6A. Each of the linear patterns LP1 to LP8 comprises four consecutively arranged pixels in the pixel matrix pattern so that the focus pixel (33) is located in the third position thereof. The linear patterns LP1 and LP2 are derived from the third row. The linear patterns LP3 and LP4 are derived from the third column. The linear patterns LP5 to LP8 are derived from diagonal lines of the pixel matrix pattern. Each of the linear patterns LP1 to LP8 starts from a pixel located in the outermost position of the pixel matrix pattern. That is, for example, the linear pattern LP1 starts from the pixel (31) which is located in the outermost position on the third row, and comprises four pixels (31), (32), (33) and (34). The focus pixel (33) is in the third position of the linear pattern LP1.

Figure 7:
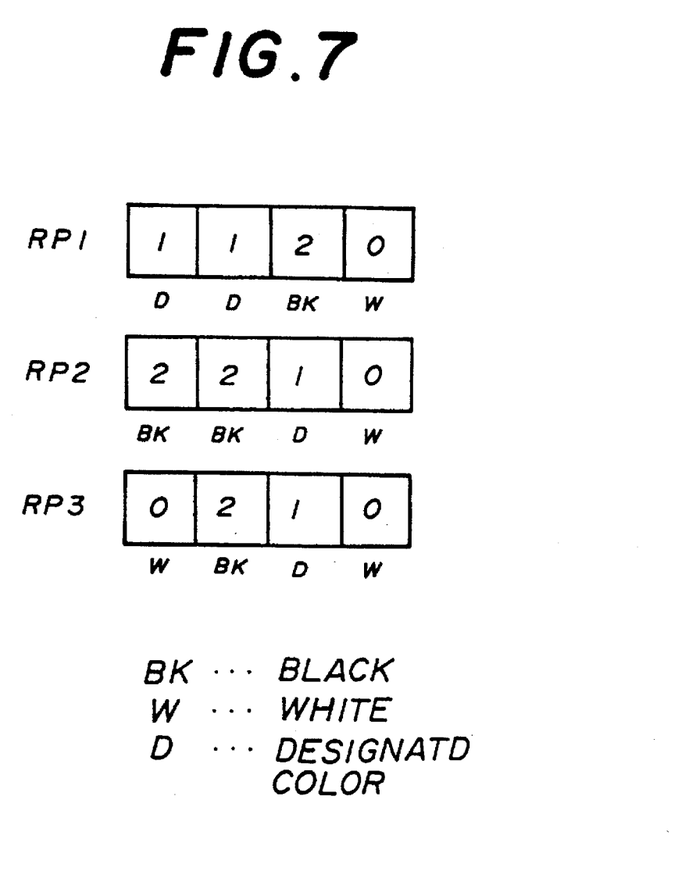
FIG. 7 is an illustration showing examples of reference patterns of which data is supplied to the pattern matching unit shown in FIG. 1.

FIG. 7 shows examples of reference patterns of which data is supplied to the pattern matching unit 13 shown in FIG. 1. The reference pattern data is supplied by a ROM (not shown in FIG. 1) to the register 12 when the initialization of the color image processing unit 1 is performed. The reference pattern data is then supplied to the pattern matching unit 13.

The reference patterns RP shown in FIG. 7 includes three reference patterns RP1, RP2 and RP3. Each of the reference patterns RP1, RP2 and RP3 comprises four portions corresponding to the four pixels in each of the linear patterns LP1 to LP8 shown in FIG. 6B. Each portion represents the color of the corresponding pixel. That is, the reference pattern RP1 represents a pattern (1, 1, 2, 0) of four pixels, which are two portions of the designated color, one portion of black and one portion of white, arranged in that order; the reference pattern RP2 represents a pattern (2, 2, 1, 0) of four pixels, which are two portions of black, one portion of the designated color and one portion of white, arranged in that order; the reference pattern RP3 represents a pattern (0, 2, 1, 0) of four pixels, which are one portion of white, one portion of black, one portion of the designated color and one portion of white, arranged in that order.

Figure 8:
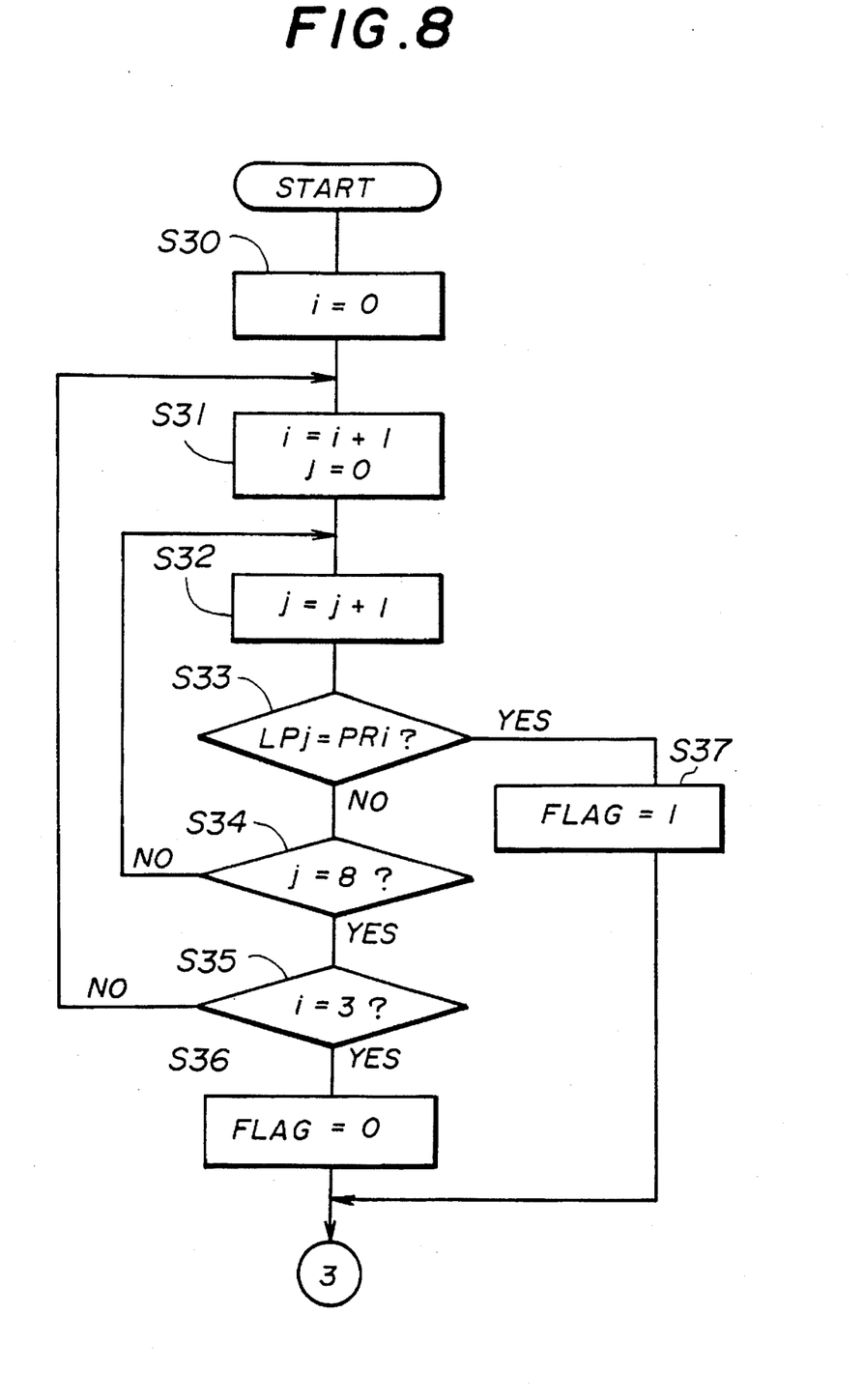
FIG. 8 is a part of a flow chart of a color shear correcting process performed by a second section of the two-color image processing unit shown in FIG. 1.
Figure 9:
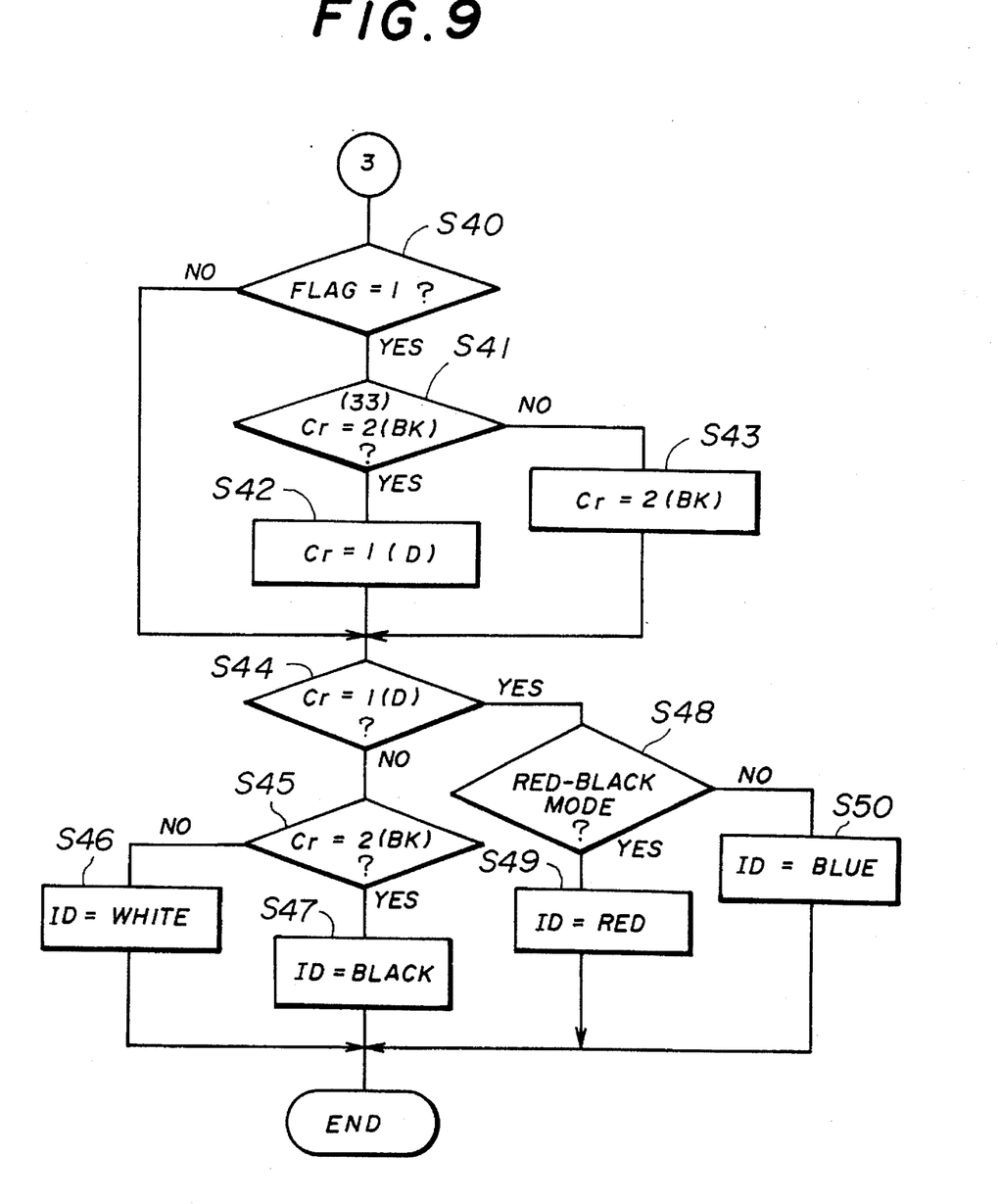
FIG. 9 is a part of a flow chart of a color shear correcting process performed by a second section of the two-color image processing unit shown in FIG. 1.

FIGS. 8 and 9 show a part of a flow chart of a color shear correcting process performed by the second section of the two-color image forming unit 2 shown in FIG. 1. The part of the color shear correcting process shown in FIG. 8 is performed by the pattern matching unit 13, and that shown in FIG. 9 is performed by the color shear correcting unit 14.

When the routine shown in FIG. 8 is started, an index i is cleared to 0 in S30. In S31, the index i is incremented by one, and another index j is cleared to 0. In S32, the index j is incremented by one, and the routine proceeds to S33.

It is determined, in S33, whether or not th linear pattern LPj (LP1) shown in FIG. 6B matches the reference pattern RPi (RP1) shown in FIG. 7. If it is determined that LPj matches to RPi, the routine proceeds to S37 where a flag is set to 1, and then the routine proceeds to S40 shown in FIG. 9. If it is determined that LPj does not match to RPi, the routine proceeds to S34.

In S34, it is determined whether or not the index j is equal to 8. If the index j is not equal to 8, the routine returns to S32. If it is determined, in S34, that the index j is equal to 8, the routine proceeds to S35 where it is determined whether or not the index i is equal to 3. If it is determined that the index i is not equal to 3, the routine returns to S31. If it is determined, in S35, that the index i is equal to 3, the routine proceeds to S36 where the flag is reset to 0, and then proceeds to S40 shown in FIG. 9.

The steps from S31 to S35 are provided for comparing each of the linear patterns LPj (LP1 to LP8) with each of the reference patterns RPi (RP1 to RP3). If there is at least one linear pattern which matches to one of the reference patterns, the flag is set to 1. If there is no linear pattern which matches to any one of the reference patterns, the flag is set to 0.

In S40, it is determined whether or not the flag is equal to 0, that is, it is determined whether or not at least one linear pattern matches to one of the reference patterns. If the flag is equal to 0, the routine proceeds to S41 where it is determined whether or not the color signal Cr of the focus pixel (33) produced in the process shown in FIGS. 2 and 3 is equal to 2 (black). If the color signal Cr is equal to 2, the routine proceeds to S42 where the color signal Cr is set to 1 (designated color), and then proceeds to S44. If it is determined, in S41, that the color signal Cr is not equal to 0, the routine proceeds to S43 where the color signal Cr is set to 2 (black), and then proceeds to S44. That is, in the steps S41 to S43, the discriminated color of the focus pixel (33) is inverted from black to the designated color or from the designated color to black.

If it is determined, in S40, that the flag is not equal to 1, the routine directly proceeds to S44.

In S44, it is determined whether or not the color signal Cr is equal to 1 (designated color). If the color signal Cr is not equal to 1, the routine proceeds to S45 where it is determined that the color signal Cr is equal to 2 (black). If it is determined, in S45, that the color signal Cr is not equal to 2 (this means that Cr is equal to 0), the routine proceeds to S46 where an ID signal is set to a value representing white, and the routine ends. If it is determined, in S45, that the color signal is equal to 2, the ID signal is set, in S47, to a value representing black, and the routine ends.

On the other hand, if it is determined, in S44, that the color signal Cr is equal to 1 (designated color), the routine proceeds to S48 where it is determined whether or not the red-black mode has been selected in accordance with the mode signal supplied to the color shear correcting unit 14. If it is determined that the red-black mode has been selected, the ID signal is set, in S49, to a value representing red, and the routine ends. If it is determined, in S48, that the red-black mode has not been selected (which means that the blue-black mode has been selected), the ID signal is set, in S50, to a value representing blue, and the routine ends.

Figure 5E:
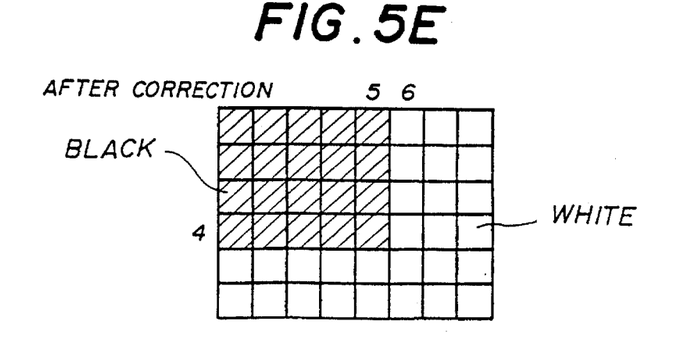

According to the above-mentioned color shear correcting process, even if the undesired color (red) is tending to appear along the edge of the black portion due to a color shear as shown in FIG. 5D, the undesired color is corrected to black as shown in FIG. 5E, and thus a two-color image having no color shear can be obtained.

In the color-image processing unit 1 shown in FIG. 1, if either the red-black mode or the blue-black mode is selected, and the ID signal is supplied from the color shear correcting unit 14 to the color-component separating unit 22. The color-component separating unit 22 changes values of the color-image signals R, G and B to 0, when the ID signal having the value representing black is supplied, and outputs the signals R, G and B to a next processing unit. If the ID signal represents white, the signals R (red), G (green) and B (blue) are set to 255. If the ID signal represents red, the signal R is set to 255 and the signals G and B are set to 0. If the ID signal represents blue, the signal B is set to 255 and the signals R and G are set to 0.

When a two-color image having gradation in brightness is formed, the color-image signals R, G and B supplied to the selector 5 are also supplied to the timing adjusting unit 21. The color-image signals R, G and B are temporarily stored in the timing adjusting unit 21, and then the signals are supplied to the color-component separating unit 22 in synchronization with a supplied timing of the ID signal to the color-component separating unit 22. The color-component separating unit 22 determines the gradation level of each of the signals R, G and B being output to the next process in accordance with the gradation level of the color-image signals R, G and B supplied by the timing adjusting unit 21 and the ID signal supplied by the color shear correcting unit 14.

In the above-mentioned embodiment, although the focus pixel is located in the third position of the linear pattern as shown in FIG. 6B, the linear pattern may be derived from the pixel matrix pattern so that the outermost pixel is located in the last position and the focus pixel is located in the second position. In such a case, the arrangement in the reference patterns shown in FIG. 7 must be also inverted.

Additionally, in the above-mentioned process, the signals corresponding to red and blue are represented by one designated color (Cr=1), and those signals are separated to red or blue when the ID signal is produced in the color shear correcting unit 14 in the last part of the process. However, different color-discriminating codes may be provided to the red and blue, respectively, so as to separately process those signals. In such a case, two sets of the reference patterns shown in FIG. 7 are prepared for red and blue, and one of the sets to be used by the pattern matching unit 13 may be selected in accordance with the mode signal.

The present invention is not limited to the specifically disclosed embodiments, and variations and modifications may be made without departing from the scope of the present invention.

What is claimed is:

1. A color-image processing and image forming method for processing three color-image signals obtained by scanning a color original, including a red-image signal representing an intensity of red color of a pixel, a green-image signal representing an intensity of green color of a pixel, and a blue-image signal representing an intensity of blue color of a pixel, the color-image processing method comprising the steps of:

a) selecting either red or blue as a designated color;

b) determining a color of the pixel as red, when red is selected as said designated color in the step a), if a value of said red-image signal is greater than a sum of a value of said green-image signal and a predetermined red correction value;

c) determining a color of the pixel as blue, when blue is selected as said designated color in the step a), if a value of said blue-image signal is greater than a sum of a value of said red-image signal and a predetermined blue correction value;

d) determining a color of the pixel as black when the color of the pixel has not been determined in the step b) or the step c); and e) forming an output image in accordance with determination results obtained in the steps b), c) and d), wherein the output image has black, white and the designated color.

2. The method as claimed in claim 1, wherein threshold values are predetermined for each of said three color-image signals, and further comprising the steps of:

f) determining a color of the pixel as white, when red is selected as said designated color in the step a), if the value of said red-image signal is greater than the threshold value for said red-image signal and the value of said green-image signal is greater than the threshold value for said green-image signal regardless of the determination results in the steps a) and d); and g) determining a color of the pixel as white, when blue is selected as said designated color in the step b), if the value of said blue-image signal is greater than the threshold value for said blue-image signal and the value of said red-image signal is greater than the threshold value for said red-image signal regardless of determination results in the steps b) and d).

3. The method as claimed in claim 2, further comprising the steps of:

h) preparing an N×N pixel matrix pattern in which a focus pixel is located in the center thereof using the color of the pixel determined in the steps a) through g), where N is an odd number;

i) preparing linear patterns of the color of the pixel, said linear pattern comprising $\{((N+1)/2)+1\}$ pixels including said focus pixel consecutively arranged along a line in said N×N pixel matrix pattern, said focus pixel being in a predetermined position of each of said linear patterns;

j) comparing each of said linear patterns with each of predetermined reference patterns so as to determine whether or not at least one of said linear patterns matches to one of said predetermined reference patterns;

k) changing the color of said focus pixel from black to the designated color selected in the step a) when the color of said focus pixel has been determined as black in the step d), and generating an ID signal representing that said focus pixel is the designated color selected in the step a);

l) changing the color of said focus pixel from the designated color selected in the step a) to black when the color of said focus pixel has been determined as red in the step b) or blue in the step c), and generating an ID signal representing that said focus pixel is black; and m) generating an ID signal representing that said focus pixel is white when none of said linear patterns matches to each of said predetermined reference patterns.

4. The method as claimed in claim 3, wherein eight linear patterns are derived from said N×N pixel matrix pattern in the step i), and a pixel located in the outermost position in said N×N pixel matrix pattern is located in the first position of each of said eight linear patterns so that said focus pixel is located in the $\{(N+1)/2\}$th position of each of said linear patterns.

5. The method as claimed in claim 3, wherein eight linear patterns are derived from said N×N pixel matrix pattern in the step i), and a pixel located in the outermost position in said N×N pixel matrix pattern is located in the last position of each of said eight linear patterns so that said focus pixel is located in the second position of each of said linear patterns.

6. The method as claimed in claim 3, further comprising the step of:

n) setting a value of each of the three color-image signals corresponding to red, green and blue for said focus pixel in accordance with the ID signal generated in the step k), l) or m), respectively.

7. The method as claimed in claim 6, further comprising the step of:

o) adjusting an intensity of each of said three color-image signals being set in the step n) in accordance with an intensity of the corresponding one of the three color-image signals obtained by scanning the color original.

8. The method as claimed in claim 7, further comprising the step of:

p) synchronizing a supply timing of the three color-image signals obtained by scanning with an output timing of the ID signal by adjusting the supply timing of the three color-image signals.

9. The method as claimed in claim 2, further comprising the steps of:

h) preparing a 5×5 pixel matrix pattern in which a focus pixel is located in the center thereof using the color of the pixel determined in the steps a) through g);

i) preparing linear patterns of the color of the pixel, said linear pattern comprising four pixels including said focus pixel consecutively arranged along a line in said 5×5 pixel matrix pattern, said focus pixel being in a predetermined position of each of said linear patterns;

j) comparing each of said linear patterns with each of predetermined reference patterns so as to determine whether or not at least one of said linear patterns matches to one of said predetermined reference patterns;

k) changing the color of said focus pixel from black to the designated color selected in the step a) when the color of said focus pixel has been determined as black in the step d), and generating an ID signal representing that said focus pixel is the designated color selected in the step a);

l) changing the color of said focus pixel from the designated color selected in the step a) to black when the color of said focus pixel has been determined as red in the step b) or blue in the step c), and generating an ID signal representing that said focus pixel is black; and m) generating an ID signal representing that said focus pixel is white when none of said linear patterns matches to each of said predetermined reference patterns.

10. The method as claimed in claim 9, wherein eight linear patterns are derived from said 5×5 pixel matrix pattern in the step i), and a pixel located in the outermost position in said 5×5 pixel matrix pattern is located in the first position of each of said eight linear patterns so that said focus pixel is located in the third position of each of said linear patterns.

11. The method as claimed in claim 9, wherein eight linear patterns are derived from said 5×5 pixel matrix pattern in the step i), and a pixel located in the outermost position in said 5×5 pixel matrix pattern is located in the last position of each of said eight linear patterns so that said focus pixel is located in the second position of each of said linear patterns.

12. The method as claimed in claim 10, wherein the predetermined reference patterns includes three patterns, a first pattern comprising two portions of the designated color, one portion of black and one portion of white, arranged in that order, a second pattern comprising two portions of black, one portion of the designated color and one portion of white, arranged in that order, a third pattern comprising one portion of white, one portion of black, one portion of the designated color and one portion of white, arranged in that order.

13. The method as claimed in claim 9, further comprising the step of:

n) setting a value of each of the three color-image signals corresponding to red, green and blue for said focus pixel in accordance with the ID signal generated in the step k), l) or m), respectively.

14. The method as claimed in claim 13, further comprising the step of:

o) adjusting an intensity of each of said three color-image signals being set in the step n) in accordance with an intensity of the corresponding one of the three color-image signals obtained by scanning the color original.

15. The method as claimed in claim 14, further comprising the step of:

p) synchronizing a supply timing of the three color-image signals obtained by scanning with an output timing of the ID signal by adjusting the supply timing of the three color-image signals.

* * * * *